Dec. 9, 1958 — R. A. ANDERSON — 2,863,626
ADJUSTABLE SUPPORT
Filed Jan. 4, 1955
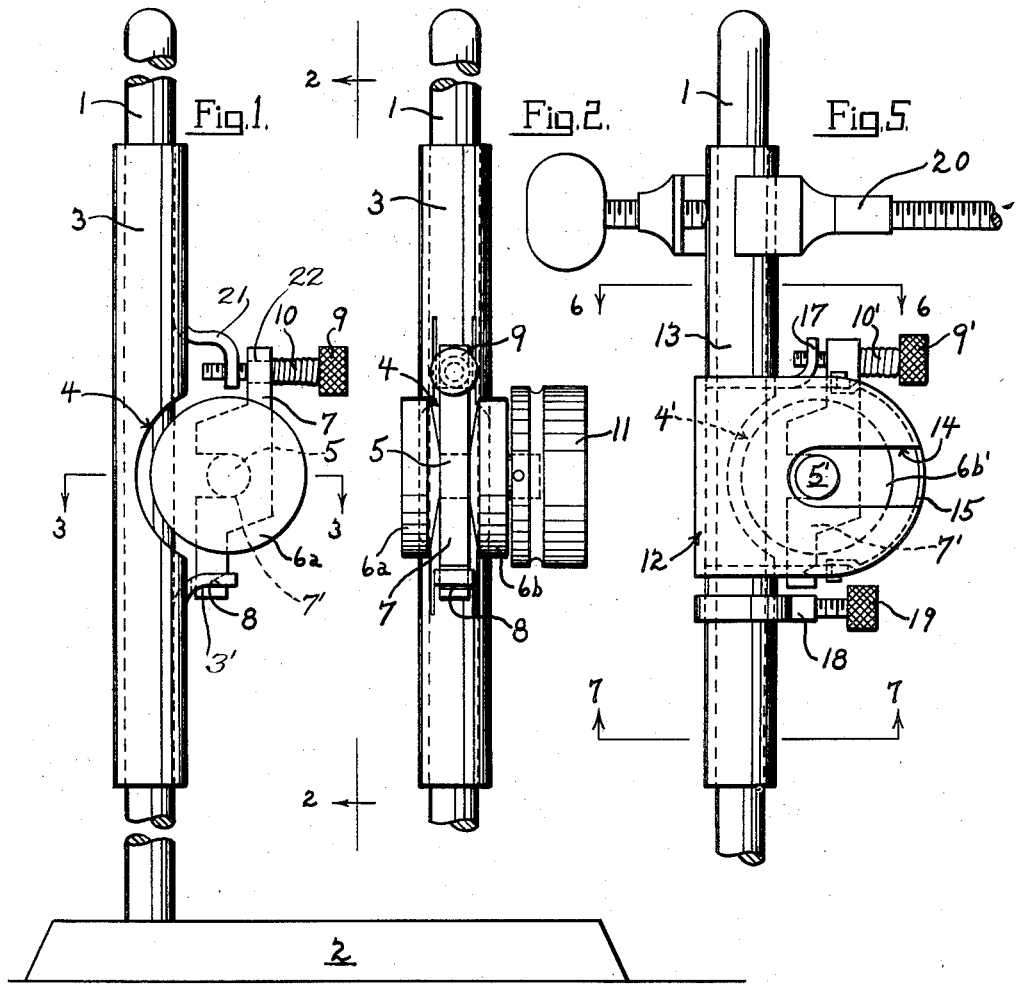
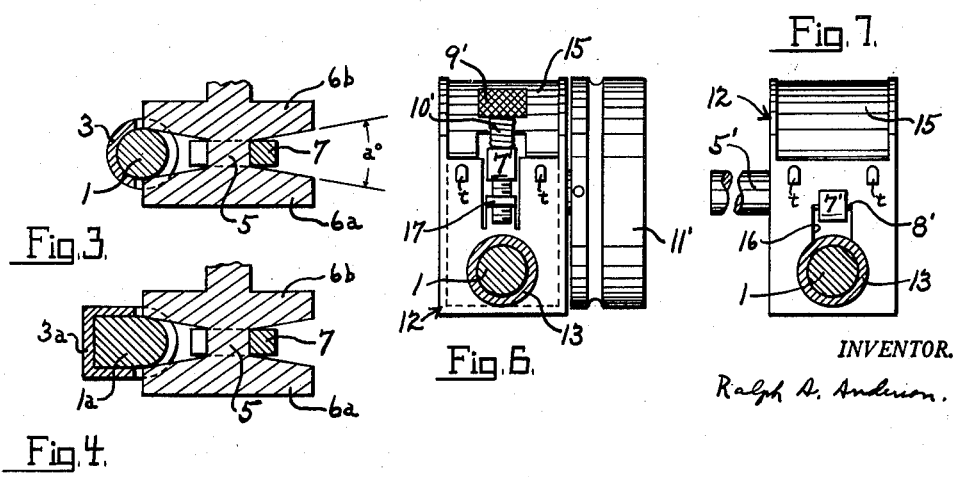
INVENTOR.
Ralph A. Anderson.

United States Patent Office 2,863,626
Patented Dec. 9, 1958

2,863,626

ADJUSTABLE SUPPORT

Ralph A. Anderson, Perth Amboy, N. J.

Application January 4, 1955, Serial No. 479,792

2 Claims. (Cl. 248—125)

The invention relates to adjustable supports of the type comprising a slidable element movable along an elongated support rod and having a friction drive mechanism thereon for enabling accurate adjustments along the rod.

Another type adjustable support has been described by me in U. S. Patent 2,692,748, wherein the support comprises a movable case having a pair of wheels engaging opposite sides of a support rod, one of the wheels providing the friction drive, and support means extending out from the case for supporting an attached load. This support, while well adapted for carrying relatively heavy loads, requires a relatively permanently attached support bracket on the case.

In the invention comprising the present improved construction, the support, while limited to lighter loads, is simpler in construction, lighter in weight, more adaptable for use with commercially available laboratory support clamps, rings, etc., and interchangeable for use on other support rods of the same cross-section.

One object of my invention is to provide an improved adjustable support having a tubular body on which standard laboratory apparatus clamps can be more conveniently attached.

Another object of my invention is to provide an adjustable support having a single rotary friction drive mechanism for effecting easy and accurate adjustments of the support along the support rod.

Another object is to provide novel and improved means for holding the single rotary friction drive mechanism on the slidable tubular element and operatively engaged with the support rod.

Another object is to provide, in an adjustable support having a peripherally grooved friction drive wheel, an elongated member connected resiliently with said support and bearing in the groove of said drive wheel for urging it frictionally against the support rod.

Still another object is to provide an adjustable support which can be used interchangeably on other support rods of the same cross-section and, in one form, adjustably rotatable thereon in a plane perpendicular to the axis of the support rod.

Further objects and advantages of the improved and simplified adjustable support construction of the present invention will become apparent as more fully disclosed in the specification.

In the drawings, Fig. 1 is a side elevation of the support for operation on a standard laboratory ring-stand rod and base, omitting hand control knob 11 (Fig. 2) for better clarity.

Fig. 2 is an elevation view of the support shown in Fig. 1 looking in the direction of the arrows 2—2 of Fig. 1, and including the hand control knob 11.

Fig. 3 is a sectional view generally along the lines 3—3 of Fig. 1.

Fig. 4 illustrates a modified construction support rod and slidable element as it would appear in a sectional view along lines 3—3 of Fig. 1.

Fig. 5 illustrates in side elevation another modified construction adjustable support wherein a case is provided for enclosing the friction drive mechanism and a locking device is provided for securing the support on the rod. Again, the hand control knob 11' has been omitted for clarity.

Fig. 6 is a view, partly in section, of the modified support taken along lines 6—6 of Fig. 5, and including hand control knob 11'.

Fig. 7 is a view, partly in section, of the support taken along lines 7—7 of Fig. 5, with the locking device elements 18 and 19, and the hand control knob 11', removed.

Referring now to Figs. 1–3 of the drawing, the adjustable support comprises a support rod 1 of uniform circular cross-section mounted on a base 2. A slidable tubular element 3 close-fitting but is freely slidable on the rod 1 and has a cut-out section 4 which exposes a portion of the rod 1 therein. The friction drive mechanism comprises the shaft 5 carrying a pair of spaced-apart bevelled discs 6a and 6b concentrically thereon.

As disclosed in my U. S. Patent 2,692,748, the bevelled surfaces of the discs should preferably diverge at an angle $a°$, Fig. 3, of from about 15 to 30 degrees, each surface tangentially engaging an opposite side of the rod 1, the shaft 5 should be spaced apart from the front of support rod 1, and the radius of discs 6a and 6b should not be less than the distance from the center of shaft 5 to the center of support rod 1.

While such improved friction drive construction has been found to give a most effective friction drive, it will be appreciated that, in certain light load applications, other design grooved friction drive wheels may be substituted to give a less effective but suitable adjustable drive.

In Fig. 1 novel means is disclosed for holding the friction drive mechanism aligned in the cut-out section 4 and in rotatable frictional engagement with the support rod 1. The elongated bar 7 is slotted transversely intermediate its ends to form a bearing 7' to receive in bearing connection the shaft 5. Bar 7 bears on shaft 5 in the peripheral groove between discs 6a and 6b and is pivotally engaged at one notched end 8 with tubular element 3 by a bent-up perforated strip formed as shown from a portion 3' of the wall of the tubular element 3 (Figs. 1 and 2). At the other end of bar 7, an adjustment screw 9 extending through spiral spring 10, and hole 22 in bar 7 and threaded to lug 21 on tube 3, provide a resilient connection to tubular element 3 at the opposite end of cut-out section 4.

Thus, by adjustment of screw 9, the frictional engagement between the friction drive wheel and rod 1 may be adjusted according to the load to be carried by the support.

The bar 7 bearing resiliently on the shaft 5 in the peripheral groove of the friction drive wheel thus holds the drive discs 6a and 6b positioned in the cut-out section 4 and the movement of the friction drive wheel along rod 1 is transferred from bar 7 to the tubular element 3 by the pivotal connection 8. The arrangement just described is not only very simple in construction but also, because of the single bearing of bar 7 riding in the groove of the friction wheel, enables a more perfect self-alignment and more effective frictional engagement of the bevelled faces of friction discs 6a and 6b on the support rod 1.

A hand control knob 11, Fig. 2, connected with the friction drive wheel is provided as shown for adjusting the support along rod 1 together with any load which may be conveniently attached on either end of tubular element 3.

In operation, it will be found convenient to adjust the screw 9 to give only slightly more than enough friction to prevent the support rolling down the rod 1, so that a minimum of extra effort is required for effecting the desired adjustments.

In the particular embodiments herein described for use in conjunction with commonly available laboratory support clamps, the tubular element should have a diameter of about one-half to five-eighths of an inch. The length of the tubular element 3 should be enough so that ordinary laboratory support clamps 20 can be attached thereon at either end and extending therefrom in any desired direction, for supporting any apparatus to be carried by the adjustable support. However, such dimensions are only illustrative of the requirements of this particular embodiment and are not to be considered as limiting the scope of the invention except as set forth in the claims.

It should be obvious that the construction just described will permit interchangeable operation of the support on other support rods of the same cross-section and that the entire support may be freely rotated around the axis of the support rod.

One modification of the drive construction of Fig. 3 is shown in Fig. 4 where, in cross-section, the support rod 1a and its cooperating slidable tubular element 3a are round in front and rectangular at the rear side. Such non-circular construction is of value where restriction of travel of the support along a fixed longitudinal path is desired.

It should also be obvious that many modifications in the construction of the tubular element and variations in the manner of connecting the bar 7 resiliently with the tubular element may be made, but such modifications or variations should not be considered as avoiding the scope of the appended claims.

Another modified adjustable support construction is shown in Figs. 5, 6, and 7, wherein the same numerals primed refer to similar parts in other figures of the drawing. A case 12 is attached on the tubular element 13 as shown for enclosing the friction drive mechanism therein and for holding it aligned in the cut-out 4' of the slidable element 13 and in frictional engagement with the support rod 1. It should be understood that the construction of the friction drive mechanism indicated in side elevation only in Fig. 5 at 6b' is identical with that already disclosed in Figs. 2 and 3, so that the bar 7' bears resiliently on the groove of the friction wheel for holding it in the cut-out 4' and for urging it against the support rod 1. The construction of the case 12 will largely be obvious from the drawing as being open only along its top, curved side. A slot 14, Fig. 5, is cut down from the top on one side of case 12 for mounting the friction drive wheel therein and should not contact that part of shaft 5' which extends outside of the case (Fig. 7). In Fig. 6, it will be seen that the hand control knob 11', which is removed in Fig. 5, has the same radius as the curved side of case 12 so that the slot 14 is covered by the knob 11'. A curved sheet of metal 15, Figs. 5–7, between and conforming with the top, curved side of case 12, is provided with integral tongues t, t, Figs. 6 and 7, for holding it in position as a cover for the open, curved side of case 12.

The notched pivot end of bar 7', Figs. 5 and 7, passes through a slot 16 at one end of case 12 and provides a pivotal driving connection at 8' from the rotary friction drive wheel to the tubular element 13. At the opposite side of case 12, an integral strip 17 is bent outwardly from case 12 for threadable engagement by the adjustment screw 9' which passes freely through the end of bar 7' as shown. The compression spring 10' on screw 9' provides a resilient pressure on the end of bar 7' which may be increased or decreased as desired by adjustment of screw 9' for urging the friction drive wheel against the support rod 1, according to the load being carried by the support.

One example of a locking device which may be used for holding the support securely in an adjusted position is shown in Fig. 5. A collar 18 on tubular element 13 is provided with a threaded member 19 which passes through element 13 and can be tightened directly against the support rod 1.

Fig. 5 discloses the manner in which any conventional laboratory support clamp 20 (in part) may be conveniently attached on the tubular element at either end, and in any desired position, for adjustment along the support rod.

In the specific embodiments which have been disclosed for use on conventional laboratory support rods having a diameter of about three-eighths to one-half inch, clamp-attached loads of about 2000 grams (4 pounds) can be conveniently raised or lowered. Although I have described and shown an improved adjustable support for use in connection with standard laboratory support clamps, it will be appreciated that the invention may be equally well adapted for use in other light load support applications.

The device has been found to be particularly useful in adjusting the positions of various electrodes in solutions, spark gaps, switch contact positions, etc.; for adjusting the depth of immersion of laboratory ware in or above heating or cooling baths or surfaces for controlling temperature rise or drop; for holding small metal parts in close and accurate alignment for soldering, welding, etc.; for adjusting positions of lenses or lamps; gas bulb levelling applications, and many others.

While the several features and advantages of the present invention and certain modifications thereof have been fully disclosed, it will be appreciated that many other modifications and variations in the construction will occur to those skilled in the art without departing from the spirit or principles of my invention, but I do not desire to be limited to the form or details of the embodiments herein disclosed, or in any manner, other than by the following claims:

What I claim is:

1. An adjustable support for use with commercial laboratory ring stand support rods and comprising a base, a support rod of uniform circular cross-section extending upwardly from said base, an elongated tube on said rod slidable on the rear surface thereof, the diameter of said tube being not much greater than that of said rod and arranged so that commercial support clamps can be attached on either end of the tube and extended therefrom in any desired direction, a cut-out in said tube between the ends thereof and exposing a portion of the front of said rod therein, a peripherally grooved wheel in said cut-out frictionally engaging the front surface of said rod, an elongated bar spaced apart from said cut-out and in the vertical plane of said rod, a pivotal connection from one end of said bar to said tube at one end of said cut-out, said bar having a single bearing between the ends thereof riding in the groove of said wheel so that the friction wheel and tube together move in fixed relationship along the rod, a resilient connection from the other end of said bar to said tube at the opposite end of said cut-out for urging said wheel into frictional engagement with said rod, and means for rotating the friction wheel for moving the support along the rod.

2. In an adjustable support, a base, a vertical support rod of circular cross-section, a close-fitting tubular element adapted for sliding movement along and around said rod, a cut-out at the front of said tube and between the ends thereof, a rotatable grooved wheel in said cut-out adapted for frictional rolling engagement with the front of said rod, an elongated member at the front of said cut-out and in the groove of said wheel, means for urging said wheel frictionally against the support rod, said means including a pivotal connection from one end of said elongated member to the front of said tube at one end of said cut-out, adjustable spring-tensioning means at the other end of said member connected with said tube at the opposite end of said cut-out, and a fixed bearing on said elongated member in the groove of said wheel for effecting sliding movement of said tube along said rod.

References Cited in the file of this patent

UNITED STATES PATENTS

| | | |
|---|---|---|
| 1,222,915 | Anderson | Apr. 17, 1917 |
| 1,371,011 | Waite | Mar. 8, 1921 |
| 2,255,319 | Kanter | Sept. 9, 1941 |
| 2,298,741 | Lazna | Oct. 13, 1942 |
| 2,312,562 | Leonard et al. | Mar. 2, 1943 |
| 2,540,738 | Kaplowitz | Feb. 6, 1951 |
| 2,692,748 | Anderson | Oct. 26, 1954 |